United States Patent [19]

Barnes et al.

[11] 4,255,623
[45] Mar. 10, 1981

[54] APPARATUS FOR PULSE TRAIN MEASUREMENT

[75] Inventors: Larry A. Barnes; Daniel Daugherty; Michael D. Flynn; Michael D. Robertson; Kenneth R. Welch, all of San Angelo, Tex.

[73] Assignee: San Angelo Communications & Electronics, Inc., San Angelo, Tex.

[21] Appl. No.: 48,779

[22] Filed: Jun. 15, 1979

[51] Int. Cl.³ ............................................. H04M 3/08
[52] U.S. Cl. ........................... 179/175.2 A; 178/69 A; 324/79 D
[58] Field of Search ............... 179/175.2 A, 175.2 R, 179/84 VF; 178/69 A; 324/140 D, 79 D, 186

[56] References Cited

U.S. PATENT DOCUMENTS

| 3,582,554 | 6/1971 | LeBlang | 179/175.2 A |
| 3,603,746 | 9/1971 | Heick et al. | 179/175.2 A |
| 3,997,740 | 12/1976 | Eubank et al. | 179/175.2 A |

FOREIGN PATENT DOCUMENTS 2356324  1/1978  France .............................. 179/175.2 A Primary Examiner—Thomas A. Robinson
Attorney, Agent, or Firm—Richards, Harris & Medlock

[57] ABSTRACT

An incoming pulse train is evaluated for interpulse spacing and pulse repetition rate by first shaping the pulses into a desired configuration in a dial pulse shaper (12). The shaped pulses are applied to a pulse counter and controller (14) to generate numerator and denominator signals of a divide function. The numerator and denominator signals are gated through a data selector (16) to an up counter controller (24). The up counter controller (24) gates a 2 KHz clock to a counter in a divider and display (18) during the denominator signal and during the numerator signal the counter within the divider display (18) is gated to perform the divide functions. The divider and display (18) carries out a division function of the numerator by the denominator with the quotient representing the percent interpulse interval or the pulse repetition rate depending on the mode of operation. In addition, the frequency of a tone pad is measured by actuating a DTMF controller (20) that drives the touch tone pad through the dial pulse shaper (12) which also generates a frequency signal having a configuration for further processing. This frequency signal is gated through the up counter controller (24) to the divider and display (18) which in this mode functions as a frequency counter. Frequency signals and various timing functions are provided by an oscillator and divider (28) and a counter reset (26) initiates the system and resets various system components in the measurement modes.

23 Claims, 6 Drawing Figures

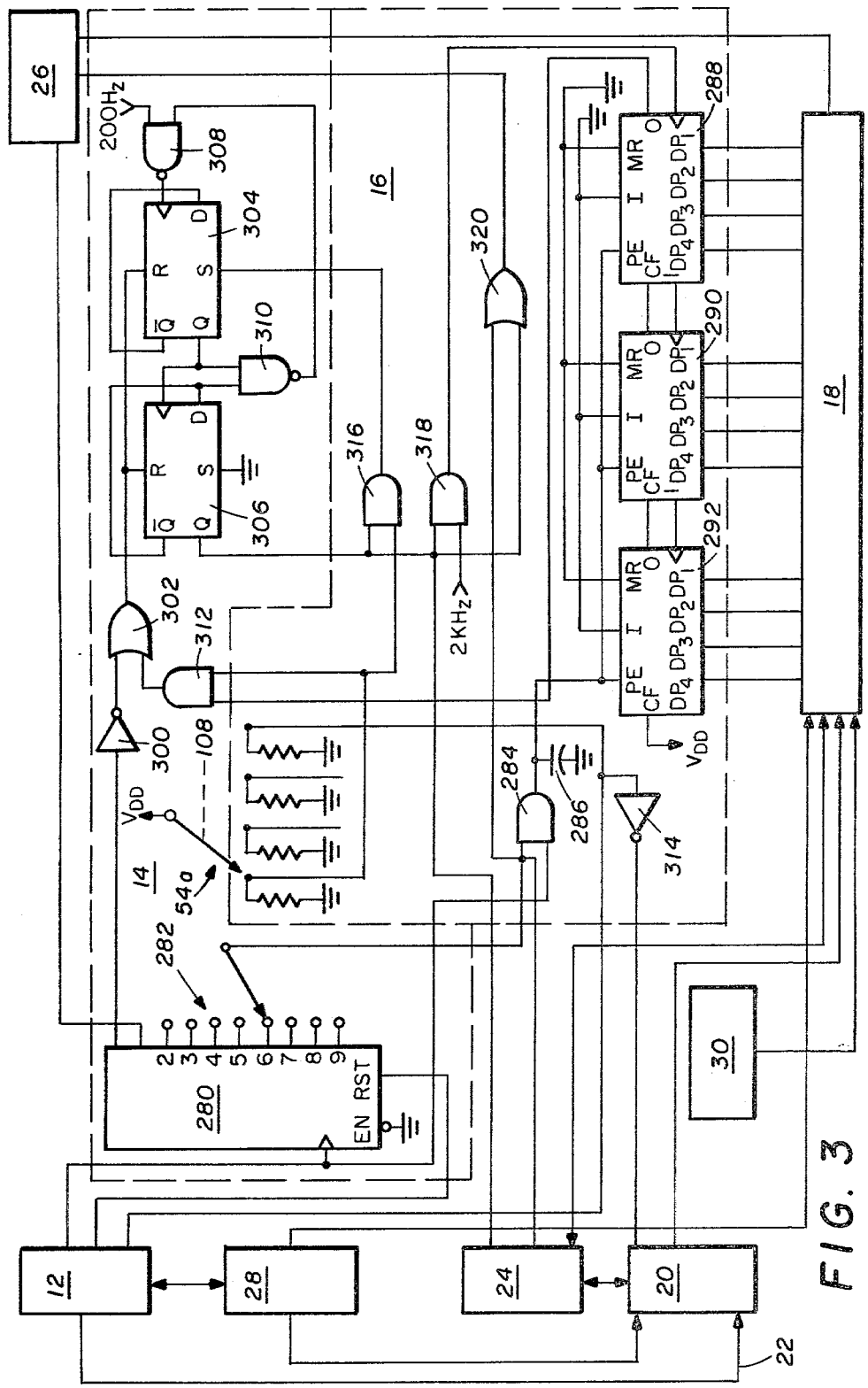

APPARATUS FOR PULSE TRAIN MEASUREMENT

TECHNICAL FIELD

This invention relates to apparatus for measuring various characteristics of a pulse train, and more particularly to apparatus for measurement of the make and break portion of a train of pulses from a rotary dial mechanism and for measuring the frequency of a dual tone multifrequency pulse train from a tone pad.

BACKGROUND ART

Presently, the conventional telephone set employs either a rotary dial mechanism or a multifrequency tone pad for generating signals representing a desired numeric or alphanumeric sequence. The conventional rotary dial mechanism is a mechanical device embodying switching structure which interrupts direct current flowing through the dial contacts so as to generate a series of electrical pulses in a pulse train. Such pulses typically have a forty percent make time (high energy) and a sixty percent break time (low energy), the latter also identified as an interpulse interval. The tone pad, when used in place of the rotary dial mechanism, generates tone signals composed of two fundamental frequencies; these frequency signals are decoded into a digital form representing the numeric or alphanumeric sequence. The pulse train from either the rotary dial mechanism, or the digital signals after decoding from the tone pad, connects to central office equipment that operates to interconnect a calling party to the remote station identified by the sequence. To ensure that the central office equipment operates properly, the rotary dial mechanism must operate at the correct dial speed and produce a pulse train having the correct pulse width (break time), or the tone pad must generate the correct fundamental frequencies.

The characteristics of telephone switching equipment in a central office location require that the incoming dial pulses, and the periods between them, meet certain timing criteria. One of these criteria is the pulse repetition rate, that is, the rate at which the pulse interval periods occur. A second timing criteria widely used in checking pulse trains is the so called percent break, defined as the ratio of the interpulse interval, or break period, to the repetition period (the sums of the pulse and interpulse interval durations). It is particularly desirable to test incoming dial pulses simply and quickly for these two criteria; the apparatus for making such tests should enable a speedy determination that the mechanism generating the pulse train is operating as desired.

The pulse repetition rate, also identified as the dial speed for a rotary dial mechanism, is defined in pulses per second and heretofore has generally been measured as the repetition rate averaged over the entire pulse train rather than on a pulse by pulse basis. However, since the telephone equipment to which the pulse train is connected only operates reliably when the pulse train has a specified minimum repetition period, it has been found that it is more desirable to check the repetition rate on a pulse by pulse basis rather than on the basis of an average over the entire pulse train. It has also been found to be more desirable to check the pulse and interpulse interval periods directly on the basis of individual time durations, rather than by an averaged measurement.

DISCLOSURE OF THE INVENTION

Percent break of the mechanical switches of a rotary dial mechanism is measured by a division of the time of a repetition period (denominator) into the interpulse interval of the repetition period (numerator) in a programmable divider. The speed of operation of the rotary dial mechanism is measured by dividing a pulse repetition period (denomiator) into a fixed pulse width (numerator) in a programmable divider. To measure the operation of a dual tone multifrequency tone pad, the frequency signals from the tone pad are converted into a pulse train and input to a pulse counter.

In accordance with the present invention, apparatus for measuring the percent interpulse interval period (break time) and the repetition rate of a pulse train includes input circuitry connected to recieve the pulse train for storing a representative count of the number of pulses in the train and for generating control signals. A data controller responds to the conrol signals and generates numerator and denominator signals for completion of a subsequent divide function. The numerator and denominator signals are connected to a divider that responds thereto and generates a percent interpulse interval signal representing the time between pulses (from the end of a pulse to the beginning of the next pulse) of a pulse train divided by the time from the beginning of a pulse to the beginning of the next pulse in the same train. This is a measurement of the precent interpulse interval of the switches of the rotary dial mechanism.

When measuring the percent interpulse interval and the pulse repetition rate of a pulse train, a selector switch identified the measurement to be made, and the divider generates either the percent interpulse interval signal or, in the alternative, generates a pulse repetition rate signal.

Further in accordance with the present invention, apparatus for measuring the fundamental frequency of a dual tone multifrequency signal of a tone pad includes an input circuit connected to receive the frequency signals of the tone pad and shape these signals into a desired digital processing configuration. A digital counter and controller connects to the input circuit to receive the digital signal and generates a representative count in Hertz of the applied frequency signals. This representative count in Hertz is gated by a one second timer that operates as a time base to assure a frequency measurement signal representative of the frequency of the signals from the tone pad.

In the apparatus for measuring the frequency of a dual tone multifrequency signal from a tone pad, an analog controller generates the required drive current to the tone pad to enable generation of the fundamental frequency signal.

BRIEF DESCRIPTION OF THE DRAWINGS

A more complete understanding of the invention and its advantages will be apparent from the specification and claims and from the accompanying drawings illustrative of the invention.

Referring to the drawings:

FIG. 3 shows an alternate embodiment of a logic diagram detailing only those parts of the system that differ from the embodiment of FIG. 2.

DETAILED DESCRIPTION

Figure 1:
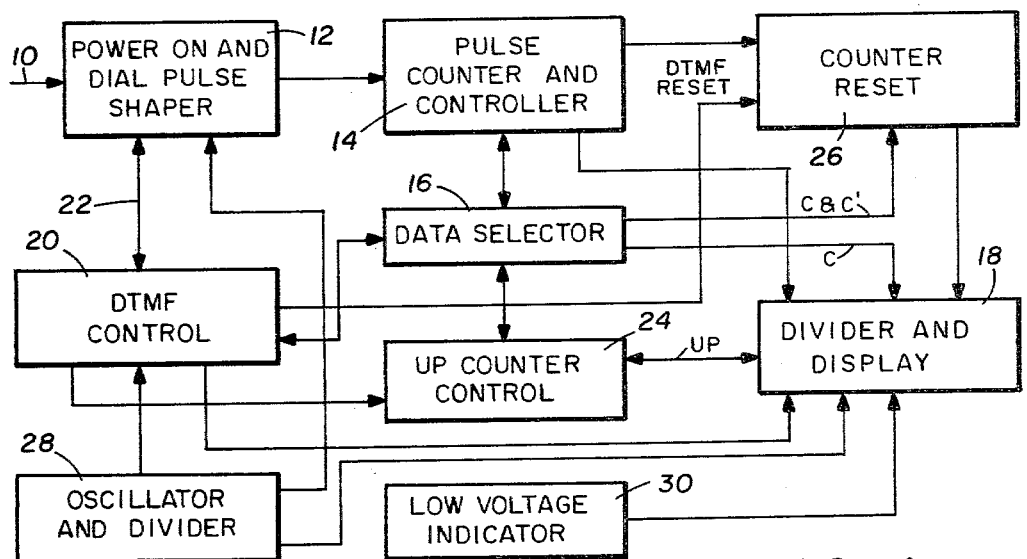
FIG. 1 is a block diagram of apparatus in accordance with the present invention for measuring the percent break and dial speed of a rotary dial mechanism and the fundamental frequency of a dual tone multifrequency touch tone pad.
Figure 2A:
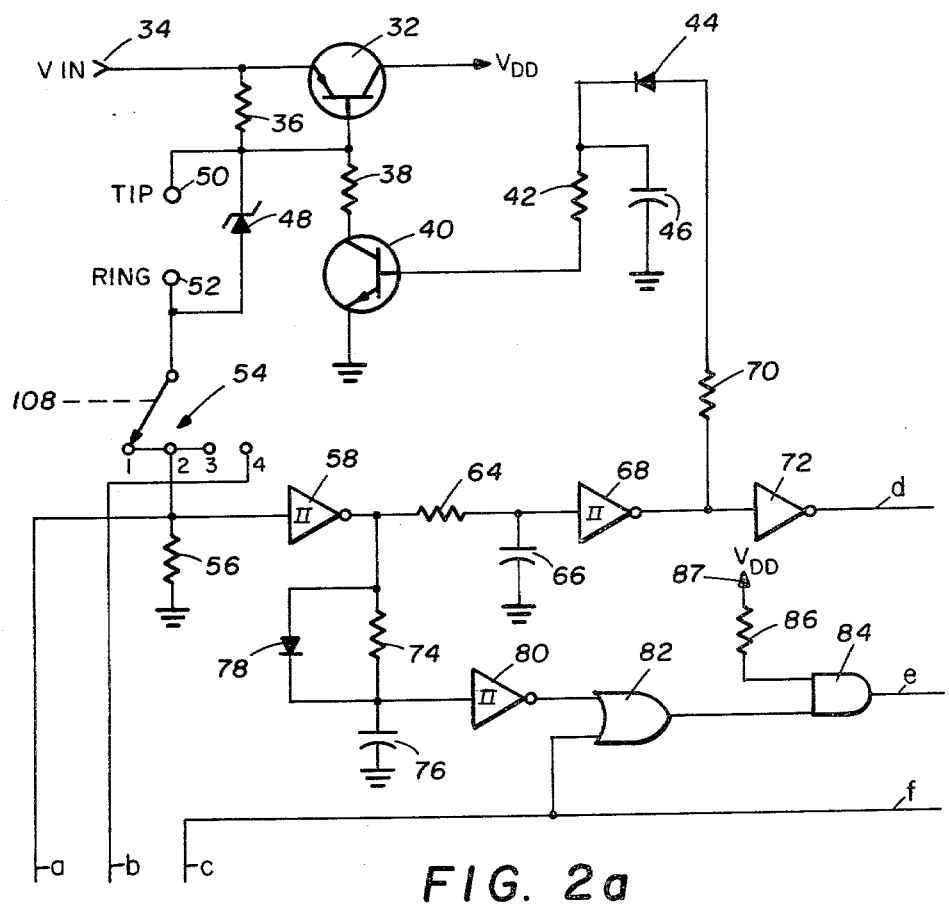
FIGS. 2a-2d are logic diagrams of one embodiment of the apparatus of FIG. 1.
Figure 2B:
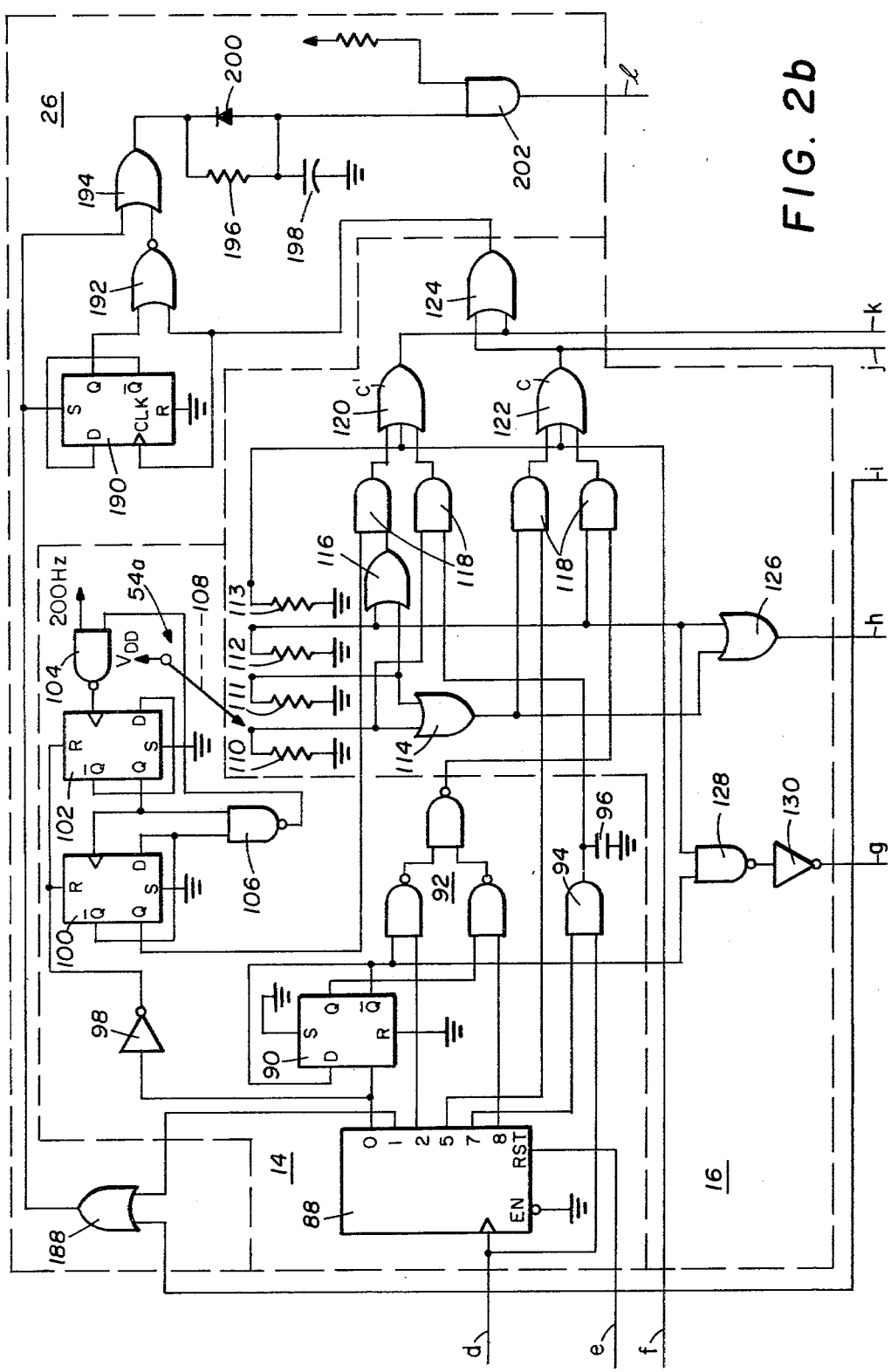
Figure 2C:
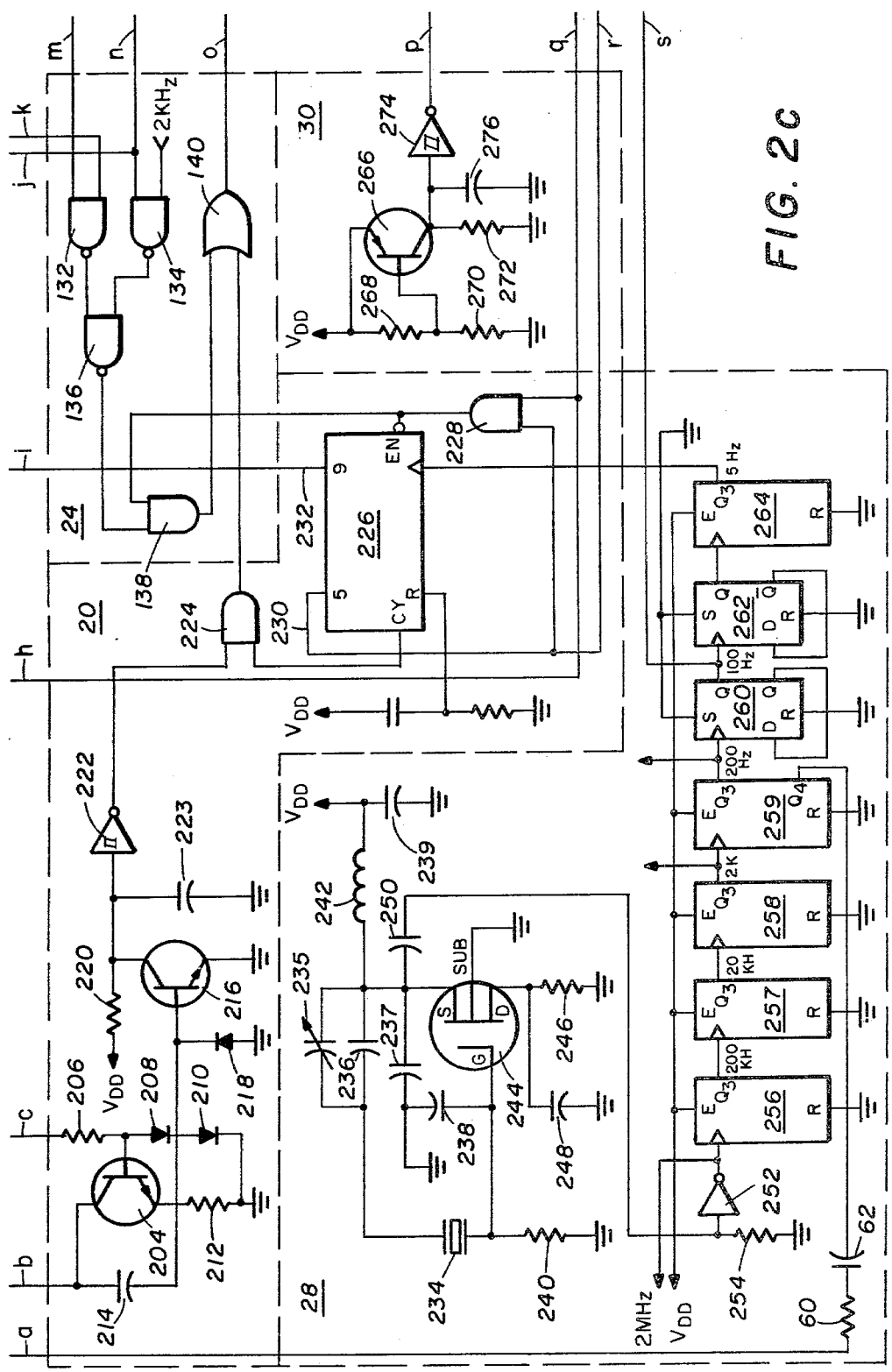
Figure 2D:
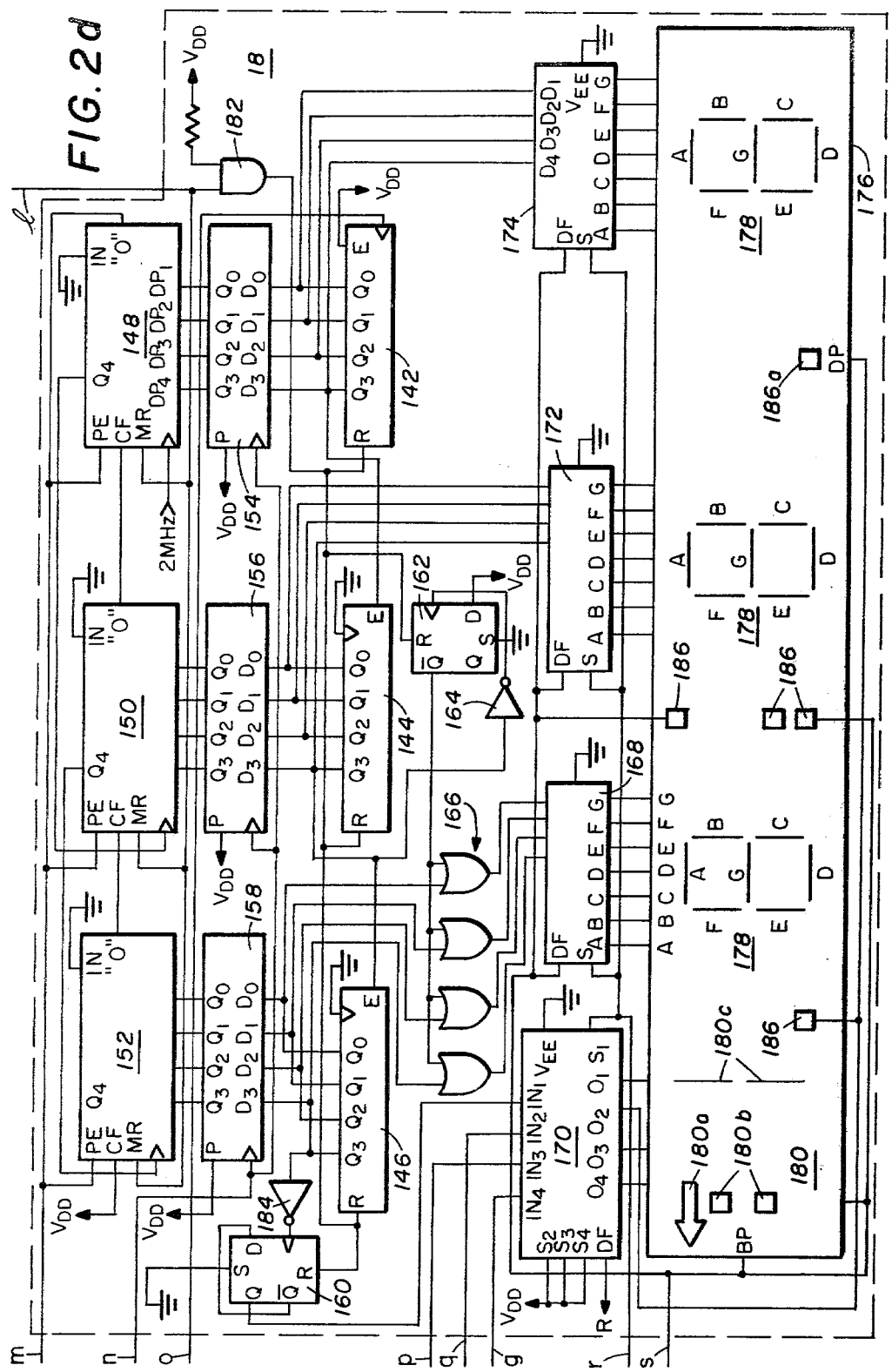

With reference to FIG. 1, a rotary dial mechanism or touch tone pad is connected by means of an input line 10 to a power and pulse shaper network 12. Thus, the input signals are derived from either a mechanical rotary dial mechanism or a touch tone pad. These input signals are applied to the network 12 which includes an input filter that functions as a shaping circuit for the incoming signals from the rotary dial or the tone pad. Once detected and filtered, the pulses are shaped by Schmitt triggers as part of the network 12 to provide compatible signals to the remainder of the circuitry. Thus, the output of the network 12 is in a pulse train form representative of dial pulses. Also included as part of the network 12 is a power supply that is activated when a telephone receiver goes "off hook". This enables the circuit to conserve the power source (battery) when not in use.

Output pulses in digital form are transmitted from the network 12 and applied to a pulse sequence counter and controller 14 that maintains in storage a representative count of the number of pulses in a train and generates control signals to initiate the operation of other elements of the system. As will be explained in greater detail, the pulse sequence counter and controller 14 includes circuitry to provide for selection of measurement of the percent break of a mechanical rotary dial mechanism. In addition, the pulse sequence counter and controller generates fixed time duration pulses for measurement of dial speed for various pulse intervals.

Interconnected to the pulse sequence counter and controller 14 is a data selector 16 that functions to select the desired gate times necessary for completing the measurements of percent break and dial speed. There are four input signals applied from various elements of the system to the data selector 16 and five output signals generated by the data selector. Two of the output signals of the data selector 16 are applied to a divider and display 18 and are used as the numerator and denominator of a divide function. When measuring percent break, one output signal from the data selector 16 to the divider and display 18 corresponds to the fifth dial pulse period (a denominator signal), and the break portion of the dial pulse period (a numerator signal) will also be gated out from the data selector to the divider and display. When measuring typical dial speed, one output of the data selector 16 is the fifth dial pulse period (again the denominator signal), and the numerator signal output from the data selector 16 is a ten millisecond (10 ms) pulse, that is, a pulse having a width of ten milliseconds in time duration. Alternately, when measuring dial speed, the data selector 16 may gate either the second or eighth pulse period (as the denominator signal) to the divider and display 18 and again output the ten millisecond pulse as the numerator signal.

As shown, the system operates in three modes: measurement of percent break, that is, the ratio of contact break time over a unit pulse period; measurement of dial speed; and measurement of the fundamental frequency of a dual tone multifrequency signal generated from a tough tone pad. When in the dual tone multifrequency (DTMF) mode, the data selector 16 outputs a signal to enable a DTMF sequencer as part of a DTMF control 20. In addition to a sequencer, the DTMF control 20 includes a constant current source and shaping amplifier. When the system is in the DTMF mode, the constant current source is turned on and supplies a current drive signal over a line 22 to the shaper 12 and, by means of the lines 10, to the tone pad of a telephone receiver. The fundamental frequency generated at the tone pad is then picked off and applied to the shaper network 12, wherein this frequency is amplified and shaped through a Schmitt trigger into a pulse train signal configuration to be compatible with the remainder of the circuitry. These amplified and shaped signals are then transferred over the line 22 to the DTMF control 20.

Included in the DTMF control 20 is the sequencer that produces all the necessary control signals for measurement in the DTMF mode. One of these control signals is a gate that enables circuitry to pass the pulse train signals on the line 22 to the data selector 16. The data selector 16 then transmitts the amplified and shaped signals on the line 22 to the divider and display 18.

Also connected to the data selector 16 is an up counter control 24 that gates various reference frequencies to the up counters. In the percent break and dial speed mode, a reference frequency (2 KHz) is gated to the up counters during the denominator period. During the numerator period, a frequency originating from the divider/display is gated back to the up counters. In DTMF, the fundamental frequency supplied from the DTMF control is gated directly to the up counters.

Connected to various elements of the circuit of FIG. 1 is a counter reset 26 that functions to reset the divider and display 18 at various stages during the measurement of the characteristics of a rotary dial mechanism. Initially, the counter reset 26 resets the counters of the divider and display 18 and subsequently resets the counters after the denominator signal has been routed thereto.

Timing signals for operation of the circuit of FIG. 1 are provided by an oscillator and divider 28 that utilizes a crystal oscillator for generating a time base. The frequency from the crystal oscillator is divided to provide the various reference frequencies to elements of the system.

To monitor operation of the divider and display 18, there is connected thereto a low voltage indicator 30 that senses battery voltage. When battery voltage falls below a pre-established level, this low voltage condition will be indicated in the display portion of the divider and display 18.

With reference to the divider and display 18, the divide circuit portion of this network completes the division of the numerator signal by the denominator signal. The quotient is binary coded decimal (BCD) format and represents the percent break or the dial speed, depending on the system mode of operation. In the DTMF mode, the divide circuit functions as a frequency counter, and the output is a BCD signal equivalent of the frequency on the line 22 in Hertz. Basically, the divider portion of the divider and display 18 consists of cascaded up counters, latches, and cascaded programmable dividers, the latter being the heart of the divide function. The display part of the divider and display 18 consists of a liquid crystal display (LCD) that indicates the decimal equivalent of the BCD signals output from the divider portion. The display is driven by the output of the up counters in the divider/display.

Referring to FIGS. 2a-2d, there is shown a detailed diagram of one embodiment of the system of FIG. 1. Power is applied to all circuitry through a transistor 32 connected to a battery supply by means of a line 34. A bias resistor 36 interconnects the emitter and base of the transistor 32, with the latter also connected by means of a resistor 38 to a transistor 40. The transistor 40 is grounded at the emitter electrode and has a base electrode connected through a resistor 42 to a diode 44 and a capacitor 46. Also connected to the base electrode of the transistor 32 is a Zener diode 48 having terminals connected to the line 10, here identified by a "tip" terminal 50 and a "ring" terminal 52. To select the mode of operation of the circuit of FIG. 2, the wiper arm of a four position switch 54 also connects to the ring terminal 52.

Positions 1-3 of the switch 54 are interconnected to a bias resistor 56 and an input of a Schmitt trigger 58. These three positions of the switch 54 are also interconnected to the oscillator and divider 28 at a resistor 60 in series with a capacitor 62. In the circuit implementation as illustrated in FIG. 2, the frequency of the signal on the line containing the resistor 60 and the capacitor 62 is 200 Hz.

An output of the Schmitt trigger 58 is connected to a time delay circuit consisting of a resistor 64 and a capacitor 66. This time delay circuit is tied to an input of a Schmitt trigger 68. An output of the Schmitt trigger 68 is interconnected to the diode 44 through a resistor 70 and also connected to the input of an inverter amplifier 72. The output of the inverter amplifier 72 represents the input signal connected to the terminals 50 and 52 after shaping to be compatible with subsequent circuitry of the system. Thus, the output of the amplifier 72 is a pulse train applied to the pulse counter and controller 14.

Also connected to the output of the Schmitt trigger 58 is a timing circuit consisting of a resistor 74 in series with a capacitor 76, and a diode 78 in parallel with the resistor 74. The interconnection of the resistor 74 and the capacitor 76 is tied to an input of a Schmitt trigger 80 having an output applied to an OR gate 82. A second input to the OR gate 82 is connected to the DTMF control 20 and the data selector block 16. An output of the OR gate 82 is connected to one input of an AND gate 84, having a second input biased through a resistor 86 by means of a voltage supply connected to a terminal 87. The output of the AND gate 84 is a reset signal applied to the pulse counter and controller 14, as will be explained.

In operation of the power and dial pulse shaper network 12, when the telephone receiver goes "off hook" and the switch 54 is in one of the first three positions, current is supplied through resistors 36 and 56, thereby biasing the transistor 32 in an "on" condition. The output of the Schmitt trigger 68 will be logic "high", thereby charging the capacitor 46 through the diode 44 and the resistor 70. This causes the transistor 40 to be turned on.

When the contacts of a rotary dial mechanism are open, that is, during the break portion of a dial pulse, the output of the Schmitt trigger 68 steps to logic "low" and reverse biases the diode 44. The transistor 40 now has a base drive supplied by the capacitor 46 as it discharges through the resistor 42. The time constant of the resistor 42 and the capacitor 46 is selected to be longer than the break portion of the dial pulse; and the transistor 40 will hold the system in a power "on" condition during dial pulsing. If the receiver is placed in an "on hook" condition, the power to the system will turn off when the capacitor 46 discharges below the drive voltage of the transistor 40.

In the DTMF mode, the switch 54 is placed in position 4, thereby connecting the ring terminal 52 to a constant current source of the DTMF control 20. The constant current generator draws sufficient current to turn on the transistor 32, thereby supplying power to the system in the DTMF mode. When the receiver is in an "on hook" condition, power is removed immediately from the system with the switch 54 in position 4, that is, in the DTMF mode.

With the switch 54 in either positions one through three, dial pulse signals as input to the ring terminal 52 are connected to the Schmitt triggers 58, 68 and 80 that comprise a dial pulse debounce and shaping circuit to properly format the dial pulse signal into a pulse train compatible with circuitry of the pulse counter and controller 14. By means of the time constant circuit, consisting of the resistor 64 and the capacitor 66, the output to the Schmitt trigger 68 follows the voltage on the ring terminal 52 but is delayed by the time constant of the resistor 64 and capacitor 66.

When the telephone receiver is put in an "off hook" condition, the output of the Schmitt trigger 58 will be logic "low", and the output of the OR gate 82 will be logic "high". As dial pulses are applied to the ring terminal 52, the first break portion switches the output of the Schmitt trigger 58 to a logic "high", which charges the capacitor 76 and switches the output of the OR gate 82 to logic "low". A logic "low" at the output of the OR gate 82 is ANDed through the AND gate 84 to remove the reset from the pulse counter and controller 14.

With the continued application of dial pulses to the ring terminal 52, the diode 78 is reverse biased during contact make time, which lasts approximately 40 milliseconds, and the capacitor 76 begins to discharge through the resistor 74. However, the make portion of the rotary dial mechanism operation is less than the time constant of the resistor 74 and the capacitor 76, and the capacitor again charges during the following break portion of the rotary dial mechanism operation. At the completion of the operation of the dial mchanism, the output of the Schmitt trigger 58 steps logic "low" and the capacitor 76 fully discharges through the resistor 74. This switches the output of the OR gate 82 to a logic "high" state, which is ANDed in the AND gate 84 to apply a reset to the pulse counter and controller 14.

During the DTMF mode of operation, the reset applied to the controller 14 must be logic "high". This is achieved by the output of the OR gate 82 driving the AND gate 84 to generate a logic "high" as a reset to the pulse counter and controller 14.

A pulse train signal shaped in the network 12 is applied to a counter 88 that will be incremented on the first break portion of the rotary dial mechanism. The output of the AND gate 84 is connected to the reset terminal of the counter 88. Connected to one output of the counter 88 is an alternate counter 90 that provides for alternate selection of a pulse interval for measurement of dial speed. Connected to the counters 88 and 90 is NAND gate logic 92. Also connected to the output of the counter 88 and the output of the inverter amplifier 72 is an AND gate 94 having an output connected to the data selector 16 and to a capacitor 96. Also connected to the output of the counter 88 is an inverter amplifier 98 having an output tied to a reset terminal of the flip-flops 100 and 102. The flip-flops 100 and 102 are stepped by the output of a NAND gate 104 connected to the 200 Hz frequency line from the oscillator and divider 28. Also, input to the NAND gate 104 is the output of a NAND gate 106 connected to the $\overline{Q}$ terminal of the flip-flop 100 and the Q terminal of the flip-flop 102. An output of the flip-flop 100 is input to the data selector 16.

During the first break portion of the dial pulse train, counter 88 is enabled by a low on line e from gate 84 and incremented by line d from inverter 72. Each succeeding pulse input to counter 88 steps the counter one additional state from state "one" through state "nine" and back to state "zero". Each time the counter 88 reaches state "zero", it clocks the alternate flip-flop 90. By this operation, the Q terminal output of the flip-flop 90 is logic "high " and the $\overline{Q}$ terminal is logic "low" initially. The reverse condition exists when the counter 88 next steps to the "zero" state. As mentioned, the flip-flop 90 provides for an alternate selection of a dial pulse interval (the denominator) for the divide function. Selection of a dial pulse interval is the function of the NAND gate logic 92. When the Q terminal of the flip-flop 90 is logic "high", the eighth pulse input to the counter 88 is gated through the logic 92 to the data selector 16. If the $\overline{Q}$ terminal is logic "high", then the second pulse input to the counter 88 is gated through the logic 92.

In the dial speed mode, as counter 88 steps to the "zero" state from state "nine", the inverter amplifier 98 holds the flip-flops 100 and 102 in reset, which function as a one-shot pulse source. When counter 88 steps to the "zero" state, a logic "high" is applied to the input of the inverter/amplifier 98, removing the reset from the flip-flops 100 and 102. The frequency signal input to the NAND gate 104 clocks the flip-flop 102, switching its Q terminal to a logic "high" output. When the Q terminal of flip-flop 102 switches "high", it in turn clocks flip-flop 100, driving its Q terminal high. The next positive clock pulse steps the Q terminal of the flip-flop 102 to a logic "low" and the third clock changes this terminal to a logic "high" condition, thereby clocking the flip-flop 100. This drives the Q terminal of the flip-flop 100 to a logic "low" level. For a 200 Hz input frequency to the NAND gate 104, the output of the flip-flop 100 is logic "high" for 10 milliseconds. With the Q terminal of the flip-flop 102 at a logic "high" state, and the $\overline{Q}$ terminal of the flip-flop 100 also logic "high", the output of the NAND gate 106 goes logic "low", thereby disabling the NAND gate 104. This prevents further clocking of the flip-flops and produces the ten millisecond numerator for dial speed measurement.

During the break portion of the dial pulse period, the numerator signal is generated by ANDing the seventh dial pulse period with the counter clock (interpulse interval) in the AND gate 94. The capacitor 96 functions as a filter to remove spikes from the numerator signal.

The numerator and denominator signals from the pulse counter and controller 14 are gated through the data selector 16 that includes a second disc 54a of the switch 54. The switch 54 in the network 12 and the disc 54a in the data selector 16 are interconnected by mechanical linkage 108. The switch positions of the disc 54a are interconnected to resistors 110–113 and also to inputs of OR gates 114 and 116. Outputs of the OR gates 114 and 116 and the numerator and denominator signals from the pulse counter 14 are input to AND gate logic 118. Output terminals of the AND gate logic 118 are interconnected to inputs of OR gates 120 and 122, with each having an output connected to one input of an OR gate 124. Also connected to each of the OR gates 120 and 122 is the fourth position of the disc 54a and a signal to the DTMF control 20.

Included as part of the data selector 16 is an OR gate 126 connected to the third switch position of the disc 54a and the output of the OR gate 114. Also connected to the third switch position of the disc 54a is a NAND gate 128 having a second input connected to the $\overline{Q}$ terminal of the alternate counter 90. An output of the NAND gate 128 is applied through an inverter amplifier 130 to the divider and display 18.

The data selector 16 selects the desired signals and gate times for making the measurements of dial speed, percent break, and frequency in the DTMF mode. The circuit receives four inputs from the pulse counter and controller 14 and generates five output signals. Two of these output signals are the numerator signal and the denominator signal from the pulse counter 14 that are utilized in a divide function of the divider and display 18. The signals that are gated through the data selector 16 are established by the position of the disc 54a with the numerator signal output from the OR gate 120 and the denominator signal output from the OR gate 122. These signals are input to the up counter control 24 and also gated by means of the OR gate 124 to the counter reset 26.

Signals input to the up counter control 24 are applied to NAND gates 132 and 134, with the former gate responsive to the numerator signal and the latter gate responsive to the denominator signal. Also input to the NAND gate 134 is a 2 KHz clock from the oscillator and divider 28. A second input to the NAND gate 132 is a signal from the divider and display 18. Interconnected to the output of the NAND gates 132 and 134 is a NAND gate 136 that drives one input to an AND gate 138 having a control signal from the DTMF control 20 connected to a second input. The output of the AND gate 138 connects to one input of an OR gate 140, which also receives an input from the DTMF control 20.

Functionally, the up counter control 24 acts as a traffic director, responding to signals from either the data selector 16 or the DTMF control 20, gating signals to the divider and display 18. The NAND gates 132, 134 and 136 comprise an AND/OR selector for gating the 2 KHz signal at the input of the NAND gate 134 fo the duration of the denominator period to the divider and display 18 with the switch 54 in either of the first three positions. The logic NAND gates 132 and 136, in operation with the NAND gate 138, gates the output of the programmable dividers, in divider display 18, into the up counters, in divider and display 18, during the numerator period as determined by the data selector 16.

When the switch 54 is in the fourth position, that is, in the DTMF mode, the AND gate 138 is disabled and the frequency applied to the ring terminal 52 is coupled through the OR gate 140 to the divider and display 18. With the system in either the dial speed mode or the percent break mode, both the numerator signal and the denominator signal are input to the divider and display 18 at an up counter 142 cascaded with up counters 144 and 146. The division of the numerator signal by the denominator signal is accomplished in the divide circuitry which consists of the cascaded up counters 142, 144 and 146, and cascaded down counters 148, 150 and 152, with both the up counters and the down counters connected to latches 154, 156 and 158. Interconnected to the up counters are blanking flip-flops 160 and 162, with the latter connected to an output of the up counter 144 through an inverter amplifier 164.

Also included as part of the divider and display 18 is OR gate logic 166 connected to the outputs of up counter 146. Outputs of the OR gate logic 166 are coupled to a display driver 168 as a part of a display driver circuit including display drivers 170, 172 and 174. Each of the display drivers 168, 170, 172 and 174 connects to a liquid crystal display 176 consisting of three numerical displays 180, and decimal points 186 and 186a.

In operation, during the first state of counter 88 in the pulse counter and controller 14, a reset signal is generated at the output of the counter reset 26 and applied to an AND gate 182 having an output connected to the up counters 142, 144 and 146. The reset signal resets the down counters 148, 150 and 152, the up counters 142, 144 and 146, and the blanking flip-flops 160 and 162. During the time interval that the denominator signal is output from the data selector 16 through the up counter control, the NAND gate 134 is enabled, thereby gating the 2 KHz signal through the OR gate 140 to the up counters 142, 144 and 146. A binary decimal coded count from the up counters is then transferred through the latches 154, 156 and 158, which have also been enabled by the denominator signal, and then applied to the input line of the down counters—dividers 148, 150 and 152.

At the termination of the denominator signal at the output of the OR gate 122, the latches 154, 156 and 158 are closed. The count signal now on the lines between the latches 154, 156 and 158 and the respective down counters 148, 150 and 152 represents a real time measurement of a denominator signal for a divide function. When the output of the OR gate 122 steps logic "low" (the end of the denominator signal), another reset signal is generated by the counter reset 26 to reset the up counters 142, 144 and 146 and holds the down counters 148, 150 and 152 in reset.

Next in the operating sequence, the numerator signal is generated at the output of the OR gate 120, which removes the reset from the up counters 142, 144 and 146, and the down counters 148, 150 and 152. A 2 MHz signal is clocked into the down counters 148, 150 and 152. Every time the number of 2MHz signals to the down counters equals the denominator measurement previously programmed into the latches 154, 156 and 158 during the denominator time interval, one pulse is generated at the output of the NAND gate 132. During the sequence when the numerator signal is available at the output of the OR gate 120, each frequency pulse from the down counters 148, 150 and 152 is gated to the up counters 142, 144 and 146, which counts the frequency output pulses until the numerator signal steps logic "low".

At the time when the numerator signal steps logic "low", there appears in the up counters 142, 144 and 146 the quotient of a divide function having as a denominator the measurement in the latches 154, 156 and 158 generated during the denominator time interval, and the numerator signal as generated by gating the output of the down counters 148, 150 and 152 during the numerator signal.

Data in the up counters 142, 144 and 146 is now decoded in the display drivers 168, 172 and 174 to activate the liquid crystal displays 178 to give a numerical indication of the quotient resulting from the divide function.

To provide an easily readable display, the divider and display logic 18 is provided with the OR gate logic 166 and the flip-flop 162 to blank all leading zeros. The leading zeros (left zero indications) of the display are blanked when a reset signal from the counter reset 26 forces the Q̄ terminal of the flip-flop 162 to a logic "high", thereby forcing all four input lines to the display driver 168 to a logic "high" through the OR gate logic 166. The flip-flop 162 is now preset, and when the up counter 144 overflows and returns to zero, the flip-flop 162 is clocked, sending the Q̄ terminal to logic "low" and the display driver 168 will now be controlled by the output of the up counter 146.

Another possible condition for the divider and display 18 is when the up counter 146 overflows, thereby clocking the flip-flop 160 through the inverter amplifier 184 to force the Q terminal of flip-flop 160 logic "high", thereby actuating the display driver 170 to display the number "1" in the liquid crystal display 176. Also indicated in the display 176 is a display arrow 180a that signifies a low battery condition as driven by an output from the low voltage indicator 30. The decimal point indicator 186a is controlled by the output of display driver 170; the remaining decimal points which are unused are connected to the backplane (BP) terminal of display 176.

With the switch 54 in position 3, a signal is generated at the output of the display driver 170 to energize the colon display 180b, thereby indicating that the divide function will be completed for the eighth pulse period.

To generate the reset signals to the divider and display 18, the counter reset 26 includes an OR gate 188 having one input connected to the counter 88 and a second input from the DTMF control 20. The output of the OR gate 188 connects to a flip-flop 190 that is clocked by the output of the OR gate 124 of the data selector 16. The Q terminal output of the flip-flop 190 and the output of the OR gate 124 are input to a NOR gate 192 having an output connected to an OR gate 194 that has a second input from the output of the OR gate 188. The output of the OR gate 194 connects to a timing network including a resistor 196 in series with a capacitor 198 where the resistor 196 is also connected to a diode 200. The diode 200 connects to one input of an AND gate 202 that generates the reset signal to the divider and display 18 by an output connection to the down counters 148, 150 and 152 and to the AND gate 182.

When receiving a pulse train, the first pulse interval steps the counter 88 to state 1. This signal drives the output of OR gate 188 to a logic "high", which sets flip-flop 190, initiating a reset. The delay in generating the reset is determined by the charge time of the timing network of resistor 196 and capacitor 198. When state 1 of the counter 88 steps logic "low", the reset is removed immediately as the diode 200 is forward biased, thereby discharging the capacitor 198. By this operation, the reset is delayed on an upward transition and is immediately removed as the OR gate 194 steps logic "low". As explained, the reset signal is used to reset the up counters 142, 144 and 146, blank the flip-flops 160 and 162 and hold the down counters 148, 150 and 152 in reset.

When the denominator signal steps to a logic "high" at the output of the OR gate 122, flip-flop 190 is clocked through OR gate 124, sending its Q terminal logic "low". A reset signal is then generated when the denominator signal goes logic "low" at the output of the OR gate 122. The output of the NOR gate 192 goes to a logic "high" as soon as the denominator signal steps logic "low". A fixed time period later, as determined by the timing network of resistor 196 and capacitor 198, the reset signal goes logic "high" and remains at this logic level until the numerator signal at the output of the OR gate 120 clocks the flip-flop 190 to reset the Q terminal to logic "high". The logic "high" connected to the NOR gate 192 drives its output to logic "low", thereby removing the reset which will not occur again until initiated by the next dial pulse train.

When the system is operating in the DTMF mode, that is, when the switch 54 is in position 4, the DTMF sequencer steps the output of the OR gate 188 and the OR gate 194 to a logic "high" for a fixed time period and at recurring fixed intervals. This develops the necessary reset to operate the divider and display 18 in the DTMF mode.

With the switch 54 in position 4, the system operates in the DTMF mode and a drive voltage is provided to the transistor 204 through a resistor 206 at a level established by diodes 208 and 210. Connected to the emitter electrode of the transistor 204 is a resistor 212 which locks the base to emitter voltage and the transistor functions as a variable resistor supplying a constant current (for example 20 milliamps) for powering a tone pad.

Frequency signals from the tone pad are input to the ring terminal 52 and applied through a capacitor 214 to the base electrode of a transistor 216 that has a base connection to a diode 218. The output of the transistor 216 is the amplified frequency signal and appears at a resistor 220; it is also applied to a Schmitt trigger 222 having an input connected to a capacitor 223. The output of the Schmitt trigger 222 is a square wave representation of the frequency signals from the tone pad and is applied as one input to an AND gate 224. A second input to the AND gate 224 is the output of a counter 226 that is clocked by the output of a counter from oscillator/divider section 28. The AND gate 228 receives an input from the OR gate 126 of the date selector 16. This AND gate enables the sequencer, comprising the counter 226, when the switch 54 is in position 4 (DTMF).

Also connected to the counter 226 is a 5 Hz signal clock from the oscillator and divider 28. This 5 Hz clock steps the counter 226 through the various states with the C (carry) output at a logic "high" level from state "zero" through state "four", that is, for one second. The fifth state of the counter on the line 230 strobes the display drivers 168, 170, 172 and 174. State "nine" of the counter 226 appears on the line 232 and resets the counters by stepping the OR gate 188 and the OR gate 194 to logic "high".

Functionally, the DTMF control 20 receives the frequency signals from the tone pad and passes these signals through the up counter control 24. Up counters 142, 144 and 146 now function as a frequency counter. The digital form of the DTMF signal is passed to the up counter through OR gate 140 for one second.

To provide the various clock frequencies for operation of the circuit of FIG. 2, a crystal 234 is connected in an oscillator circuit that develops a 2 MHz time base. The oscillator includes start up circuitry consisting of capacitors 235–239 and resistors 240 and RF choke 242. A field effect transistor 244 connects to the crystal 234 to provide the required switching action. One drive terminal of the field effect transistor 244 connects to a bias circuit of resistor 246 and capacitor 248. A second terminal connects to RF choke 242.

The 2 MHz output frequency of the oscillator is coupled through a capacitor 250 to an input of an inverter amplifier 252 having an input that is also connected to a resistor 254. The output of the inverter 252 is connected to sequential counters 256–258. At the output of the counter 258, there is generated a 2 KHz frequency signal for driving various parts of the circuitry. At the output of the counter 259, there is generated a 200 Hz signal. One output of the counter 259 is connected to a flip-flop 260, which in turn is connected to a flip-flop 262 having an output driving a counter 264. The output of the flip-flop 260 is a 100 Hz signal and the output of the counter 264 is the 5 Hz signal driving the counter 226. Thus, the oscillator and divider 28 generate a 2 MHz frequency, a 2 KHz frequency, a 200 Hz frequency, a 100 Hz frequency, and a 5 Hz frequency for sequencing the operation for each of the four modes of operation.

To ensure proper operation of the system, the low voltage indicator 30 monitors the battery voltage for a low voltage condition. The low voltage indicator includes a transistor 266 having a base electrode biased by a voltage divider, including a resistor 268 in series with a resistor 270, the former also connected to the battery supply.

An output of the transistor 266 appears at the collector electrode across a resistor 272. The output of the transistor 266 is applied to a Schmitt trigger 274 having an input also connected to a capacitor 276. The output of the Schmitt trigger 274 drives the display driver 170 connected to the display 180a.

With the battery voltage at near normal level, the transistor 266 will be conducting and the output of the Schmitt trigger will be logic "low". When the battery voltage falls to a preset level, the base of the transistor 266 reverse biases and the transistor cuts off, thereby switching the output of the Schmitt trigger 274 to a logic "high". This output is applied to the display driver 170, and the low voltage condition is indicated by illumination of the display 180a.

Referring to FIG. 3, there is shown an alternate embodiment of the system in FIG. 1 where the primary difference from the system of FIG. 2 is the logic for measuring the interpulse period, that is, the percent break in the mechanical contacts of a rotary dial mechanism. Only those parts of the system of FIG. 1 which are different from those detailed in FIG. 2 are detailed in FIG. 3.

Parts of FIG. 3 that are the same as the same part in FIG. 2 include: the power "on" and dial pulse shaper 12; the divider and display 18; the DTMF control 20; the up counter control 24; the counter reset 26; the oscillator and divider 28; and the low voltage indicator 30. Thus, those parts of the circuit of FIG. 3 that differ from FIG. 2 include the pulse counter and controller 14 and the data selector 16.

The pulse train from the power "on" and dial pulse shaper 12 is input to a counter 280 having eight output lines connected to a period select switch 282. The state "one" output of the counter 280 connects to the counter reset 26, and in particular the OR gate 188 as shown in FIG. 2. Also connected to the counter 280 is a reset pulse from the dial pulse shaper 12, and in particular the output of the AND gate 84.

Connected to the wiper arm of the period select switch 282 is an AND gate 284 having an output connected to a capacitor 286 and to the inputs of break time storage registers 288, 290 and 292. The input lines of the break storage registers are connected to the output lines of up counters 142, 144 and 146. Specifically, the input lines of the register 292 are connected to the up counter 146 in divider/display 18. The remainder of the divider/display 18 is as illustrated in FIG. 2.

Connected to the counter 280 is an inverter amplifier 300 having an output tied to the input of an OR gate 302 to provide a reset pulse to flip-flops 304 and 306 which correspond in function to the flip-flops 100 and 102 of FIG. 2. Tied to the clock terminal of the flip-flop 304 is a NAND gate 308 receiving the 200 Hz frequency signal on one input and connected to the output of a NAND gate 310 that is tied to the Q terminal of the flip-flop 304 and also the $\bar{Q}$ terminal of the flip-flop 306. A second input to the OR gate 302 is the output of an AND gate 312 having one input from the break time storage register 288 and a second input connected to the disc 54a of the switch 54.

Functionally, the disc 54a is the same as in FIG. 2. The fourth position of the disc 54a is the DTMF mode and connects to an inverter amplifier 314, to the power on and dial pulse shaper 12 and the DTMF control 20. The inverter amplifier 314 provides an output connected to the display driver 170 of FIG. 2., which functionally takes the place of OR gate 126. Connected to position 1 of the disc 54a, in addition to the AND gate 312, is an AND gate 316 having an output connected to the set terminal of the flip-flop 304. A second input to the AND gate 316 is the Q terminal of the flip-flop 306 which also connects to one input of an AND gate 318. The second input to the AND gate 318 is the 2 KHz frequency signal from the oscillator and divider 28. An output of the AND gate 318 connects to the clock input of the break time storage register 288.

Also connected to the Q output of the flip-flop 306 is an OR gate 320 having a second input from the wiper arm of the select switch 282. The output of the OR gate 320 is connected to the counter reset 26 and is the same output as provided by the OR gate 124 of FIG. 2.

With the alternate embodiment of FIG. 3, the percent break measurement, that is, the measurement of interpulse interval, represents the break time divided by the sum of the make time plus the break time to a given pulse interval. This gives an accurate reading of percent break which is independent of dial speed variation. By means of the period select switch 282, it is possible to select one of eight different pulse periods for a measurement of the percent break and dial speed. This removes the need for the alternate counter 90 of FIG. 2.

In operation of the circuit of FIG. 3, as a pulse train is applied to the counter 280, this counter steps from state "zero" to state "nine" and then back to state "zero". As it reaches the counter state which has been selected by the switch 282, the up counters 142, 144 and 146—see FIG. 2—will begin counting up at the 2 KHz pulse rate in accordance with a description of the up counter control 24 of FIG. 2. When the counter state as selected by the switch 282 is reached, the input to the AND gate 284 steps logic "high" and remains high for the duration of the break time of the selected interval being measured. The up counters 142, 144 and 146 count up at a 2 KHz pulse rate during the period being measured. During the time the output of AND gate 284 is "high" (the break time), the break registers 288, 290 and 292 receive data on their input lines at a 2 KHz rate. When AND gate 284 steps logic "low", the break register stops receiving data. The data which has now been loaded into the break time storage registers represents the break time of the pulse interval being measured. The up counters 142, 144 and 146, as shown in FIG. 2, continue receiving the 2 KHz clock for the duration of the pulse period. This count is loaded into the dividers 148, 150 and 152 and represents the pulse period.

A percent break enable signal determines whether a dial speed measurement or a percent break measurement is being made. If the percent break enable signal is logic "high", the two inputs to the AND gates 312 and 316 are enabled, and a percent break measurement is being made. Stepping switch 54 to position two enables dial speed measurements to be made; the time period generated by flip-flops 306 and 304 (10 milliseconds) becomes the numerator for the dial speed measurement.

During the measurement of a percent break, a pulse train input to the counter 280 clocks the counter through the various states until it reaches state "zero", at which time the signal into the inverter amplifier 300 steps logic "high". The output of the amplifier 300 will then be logic "low", which causes the output of the OR gate 302 to switch from logic "high" to logic "low". This removes the reset on the reset lines to the flip-flops 304 and 306, allowing these flip-flops to be clocked at a 200 Hz frequency applied to the NAND gate 308. In the reset state, the Q output of the flip-flop 304 will be logic "low", thereby causing the output of the NAND gate 310 to be logic "high". When the output of the NAND gate 310 is logic "high", the NAND gate 308 is enabled to pass the 200 Hz frequency.

As the clock frequency switches from logic "high" to logic "low", the Q output of the flip-flop 306 will be switched from a logic "low" level to a logic "high" level.

In the percent break measurement mode (position 1 of the switch 54 and the disc 54a) the output of the flip-flop 306 at the Q terminal switches logic "high", thereby enabling the AND gates 316 and 318. Also present at the input to the AND gate 316 is the percent enable signal from position 1 of the disc 54a, so that when the Q output of flip-flop 306 switches logic "high", the output of the AND gate 316 will switch logic "high" and hold the flip-flop 304 in a set condition. With the Q terminal output of the flip-flop 306 also at a logic "high", the AND gate 318 is enabled, thereby passing the 2 KHz frequency to clock the break register 288. This action initiates a count down from the previous level stored in the down counter registers 288, 290 and 292.

The registers 288, 290 and 292 continue to count down to a "zero" state, at which time the output of the register 288 will switch to a logic "high" state, thereby enabling the input to the AND gate 312. The output of the AND gate 312 also switches to a logic "high", which is ORed through the OR gate 302 and returns the flip-flops 304 and 306 to the reset state. Once these flip-flops have been returned to the reset state, the AND gate 316 will be inhibited, removing the set signal from the flip-flop 304 and also inhibiting the AND gate 318, which disconnects the 2 KHz clock frequency from the input of the down counter register 288. This stops the down counting in the registers 288, 290 and 292. The resulting output at the Q terminal of the flip-flop 306 will be a time period which is equivalent to the previously measured and stored break time.

When a switch 54 is in position 2, that is, for a dial speed measurement, the percent break enable signal will be switched logic "low" and the input to the AND gate 312 remains inhibited so that any action of the break storage registers will not affect the operation of the flip-flops 304 and 306. Also inhibited at this time is the input to the AND gate 316, which causes the set line to the flip-flop 304 to remain at a logic "low" level.

In this mode of operation, action is once again initiated by the output of the counter 280 clocking through its states to state "nine" and then returning to state "zero", at which time the input to the inverter amplifier 300 will go logic "high", causing the input to the OR gate 302 to switch logic "low" with the result that the reset is removed from the flip-flops 304 and 306. Removing the reset from the flip-flops 304 and 306 starts a sequence which is initiated by the 200 Hz clock switching to a logic "low", causing the output of the NAND gate 308 to switch to a logic "high", thereby clocking the flip-flop 304. The Q terminal output of the flip-flop 304 switches to a logic "high", causing the flip-flop 306 to toggle and the Q terminal output of this latter flip-flop switches to a logic "high", enabling the up counter 142 through the up counter control 24. During this operation, the $\overline{Q}$ output terminal of the flip-flop 306 will be logic "low" and will continue to inhibit the NAND gate 310. On the second 200 Hz clock transition from a logic "high" to a logic "low", which occurs 5 milliseconds after the first transition, or the equivalent of one pulse period of the 200 Hz clock, the flip-flop 304 will again be clocked and toggled. At this time, the Q terminal output of the flip-flop 304 switches to a logic "low", which does not affect the clock line to the flip-flop 306, since it is switched only by a logic "low" to logic "high" transition or in a positive edge trigger. The third transition of the clock, which will be 10 milliseconds after the beginning of the 200 Hz clock transition which initiated the action, the Q output of the flip-flop 304 will once again switch to a logic "high" and will toggle the flip-flop 306. At this time, the Q terminal output of the flip-flop 306 switches from a logic "high" to a logic "low". Once the flip-flop 306 is toggled, its $\overline{Q}$ terminal output will be logic "high" and the Q terminal output of the flip-flop 304 will also be logic "high", thereby enabling the NAND gate 310. The output of the Nand gate 310 now switches to a logic "low" level and inhibits the 200 Hz clock from passing through the NAND gate 308 to the clock terminal of the flip-flop 304. When the Q terminal output of the flip-flop 306 switches to a logic "low", it terminates the gate period and the measurement of dial speed will be complete.

During the operation of the system of FIG. 3 in a percent break measurement mode, the storage registers 288, 290 and 292 are used to store the break period measurement from the pulse period as selected by the switch 282. Outputs of the up counters 142, 144 and 146—see FIG. 2—are tied directly to the break time storage registers. At the end of the break portion of a pulse, a binary code representing the break time measurement is stored in the registers 288, 290 and 292. At the end of the pulse train, these registers begin counting down with the "zero" state output connected to the numerator gate. As the break time storage registers begin counting down, the numerator gate produces an output whose time period is equivalent to the original break time measurement. This action occurs with each dial pulse.

When measuring dial speed, the numerator gate produces a 10 millisecond output. This triggers the logic as explained previously.

While several embodiments of the invention, together with modifications thereof, have been described in detail herein and shown in the accompanying drawings, it will be evident that various further modifications are possible without departing from the scope of the invention.

We claim:

1. Apparatus for measuring the percent interpulse interval and the pulse repetition rate of a pulse train, comprising:
    means connected to receive the pulse train for storing a representative count of the number of pulses in the pulse train and for generating control signals,
    a data controller responsive to the control signals for generating numerator and denominator signals of a divide function, and
    divider means connected to receive the numerator and denominator signals for generating a percent interpulse interval signal representing the time between pulses (from the end of a pulse to the beginning of the next pulse) of a pulse train divided by the time from the beginning of a pulse to the beginning of the next pulse in the same pulse train.

2. Apparatus for measuring the percent interpulse interval and the pulse repetition rate of a pulse train as set forth in claim 1 wherein said data controller includes means for gating a selected pulse period as the denominator signal and for gating an interpulse interval of a pulse period as the numerator signal to said divider means.

3. Apparatus for measuring the percent interpulse interval and the pulse repetition rate of a pulse train as set forth in claim 1 wherein said data controller includes a data selector connected to select either a percent interpulse interval measurement of a pulse repetition rate measurement by said divider means, and wherein said data controller generates separate numerator and denominator signals for the percent interpulse interval measurement and the pulse repetition rate measurement.

4. Apparatus for measuring the percent interpulse interval and the pulse repetition rate of a pulse train as set forth in claim 3 wherein said data controller includes means for gating a selected pulse repetition period as the denominator signal and for gating the interpulse interval of a pulse period as the numerator signal to the divider means for the percent interpulse interval signal and for gating a selected pulse repetition period as the denominator signal and a fixed pulse width as the numerator signal to said divider means for the pulse repetition rate signal.

5. Apparatus for measuring the percent interpulse interval signal and the pulse repetition rate of a pulse train as set forth in claim 1 wherein said data controller includes means for gating the time between pulses (from the end of a pulse to a beginning of the next pulse) as the numerator signal and for generating the denominator signal from the time interval of a pulse repetition period.

6. Apparatus for measuring the percent interpulse interval signal and the pulse repetition rate of a pulse train as set forth in claim 5 wherein said means connected to receive the pulse train includes a period select switch for selecting the pulse repetition period for which the numerator signal and the denominator signal are generated.

7. Apparatus for measuring the percent interpulse interval signal and the pulse repetition rate of a pulse train as set forth in claim 6 wherein said divider means includes a storage register that begins to count down as a numerator signal during a selected pulse repetition period or at the end of a pulse train as determined by the period select switch.

8. Apparatus for measuring the percent interpulse interval and the pulse repetition rate of a pulse train as set forth in claim 7 wherein said divider means includes means responsive to the numerator and denominator signals for gating the data in said storage register to the divider means as the numerator signal.

9. Apparatus for measuring the frequencies of a dual tone multifrequency signal from a tone pad, comprising:
   means connected to receive the frequency signals of the tone pad for shaping into a processing signal configuration,
   a pulse counter and controller connected to receive the processing signal and for generating a representative count of the cycles per second in the frequency signals, and
   display means responsive to the stored representative count to generate a frequency measurement signal representative of the frequency of the signals from the tone pad.

10. Apparatus for measuring the frequencies of a dual tone multifrequency signal from a tone pad as set forth in claim 9 including an analog controller for generating the required drive current to the tone pad to enable generation of the frequency signals.

11. Apparatus for measuring the frequencies of a dual tone multifrequency signal as set forth in claim 9 including a dual tone multifrequency sequencer for generating control signals to establish the representative count of the cycles per second in said pulse counter and controller.

12. Apparatus for measuring the frequencies of a dual tone multifrequency signal as set forth in claim 9 wherein said pulse counter and controller includes counters responsive to the representative count of the cycles per second and means responsive to the output of said counters for generating a binary coded decimal representation of the frequency of the signals from the tone pad.

13. Apparatus for measuring the percent interpulse interval and the pulse repetition rate of a pulse train from a rotary dial mechanism and for measuring the frequency of a dual tone multifrequency signal from a tone pad, comprising:
   means connected to receive the pulse train for measurement of percent interpulse interval and pulse repetition rate and responsive to a representative count of the number of pulses in the pulse train and for receiving the frequency signals of the tone pad for shaping into a desired processing signal configuration representative of the cycles per second in the frequency signals, and further including means for generating control signals,
   a data controller responsive to the control signals for generating numerator and denominator signals of a divide function for measurement of percent interpulse interval and pulse repetition rate, said data controller including a data selector connected to said first means to select a measurement of percent interpulse interval, pulse repetition rate, or dual tone multifrequency signal, and
   divider means connected to said data controller to receive the numerator and denominator signals for generating a percent interpulse interval signal representative of the time between pulses (from the end of a pulse to the beginning of the next pulse) of the pulse train divided by a pulse repetition period, and for generating a pulse repetition rate signal.

14. Apparatus as set forth in claim 13 wherein said data controller includes means for gating a preselected pulse repetition period as the denominator signal and for gating the break portion of a pulse repetition period as the numerator signal to the divider means with the data selector in the percent interpulse interval mode, for gating a preselected pulse repetition period as the denominator signal and gating a fixed pulse width as a numerator signal to said divider means when the data selector is in the pulse repetition rate measurement mode, and for gating to the divider means the representative count of the cycles per second with the data selector in the dual tone multifrequency mode.

15. Apparatus as set forth in claim 14 wherein said first means includes an analog controller for generating the required drive current to the tone pad to enable generation of the frequency signals.

16. Apparatus as set forth in claim 15 including a dual tone multifrequency sequencer for generating control signals to establish the representative count of the cycles per second to said data controller.

17. Apparatus as set forth in claim 16 including a reset counter connected to said data controller and to said divider means and responsive to a pulse from said controller to reset said divider means.

18. Apparatus as set forth in claim 17 wherein said divider means includes a display indicating the signal measurements.

19. Apparatus as set forth in claim 18 wherein said first means includes a power on switch responsive to an "off hook" condition of a telephone set to initiate a measurement of percent interpulse interval and pulse repetition rate of a pulse train.

20. Apparatus as set forth in claim 19 wherein said power on switch includes means for connecting the output of tone pad to said dual tone multifrequency controller.

21. Apparatus as set forth in claim 20 wherein said divider means includes cascading up counters responsive to the signals from said data controller and further including a cascaded divider connected to said up counters.

22. Apparatus as set forth in claim 13 wherein said data controller includes means responsive to the time between pulses (from the end of a pulse to the beginning of the next pulse) as the numerator signal and for generating the denominator signal from the time interval of a pulse repetition period for measurement of the percent interpulse interval when the data selector is in the percent interpulse interval mode.

23. Apparatus as set forth in claim 22 wherein the percent interpulse interval of a pulse train is represented by the time between pulses (from the end of a pulse to the beginning of the next pulse) divided by the sum of the time between pulses plus the pulse width for a given pulse period.

* * * * *

UNITED STATES PATENT AND TRADEMARK OFFICE
CERTIFICATE OF CORRECTION

PATENT NO. : 4,255,623

DATED : March 10, 1981

INVENTOR(S) : Larry L. Barnes, Daniel Daugherty, Michael D. Flynn, Michael D. Robertson, Kenneth R. Welch It is certified that error appears in the above—identified patent and that said Letters Patent is hereby corrected as shown below:

```
Column 2, line 11, change "denomiator" to --denominator--
          Line 31, change "precent" to --percent--;
          line 36, change "identified" to --identifies--.
Column 3, line 64, "percent break" should be italicized;
          lines 65-66, "dial speed" should be italicized;
          line 66, "fundamental frequency" should be italicized.
Column 4, line 22, change "transmitts" to --transmits--.
Column 8, line 51, change "fo" to ---for---.
Column 9, line 54, after "the" second occurrence insert --down
counters which is applied to an input of the--..
Column 10, line 29, change "indicator 189a" to --indicator 189a--.
Column 11, line 45, change "date" to --data--.
Column 15, line 48, change "Nand" to --NAND--.
```

Signed and Sealed this

Twenty-fifth Day of August 1981

[SEAL]

Attest:

GERALD J. MOSSINGHOFF

Attesting Officer

Commissioner of Patents and Trademarks